(12) United States Patent
Zewail et al.

(10) Patent No.: US 12,021,771 B2
(45) Date of Patent: Jun. 25, 2024

(54) TECHNIQUES FOR CONFIGURING REFERENCE SIGNALS FOR RANDOM ACCESS MESSAGES IN WIRELESS COMMUNICATIONS

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Tao Luo, San Diego, CA (US); Jing Sun, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 17/219,162

(22) Filed: Mar. 31, 2021

(65) Prior Publication Data
US 2021/0359807 A1 Nov. 18, 2021

Related U.S. Application Data

(60) Provisional application No. 63/020,874, filed on May 6, 2020.

(51) Int. Cl.
*H04L 5/00* (2006.01)
*H04W 74/0833* (2024.01)

(52) U.S. Cl.
CPC ....... *H04L 5/0048* (2013.01); *H04W 74/0833* (2013.01)

(58) Field of Classification Search
CPC ... H04L 5/0048; H04L 5/0023; H04L 5/0094; H04L 5/0051; H04W 74/0833; H04W 74/002
See application file for complete search history.

(56) References Cited

U.S. PATENT DOCUMENTS

| | | | |
|---|---|---|---|
| 2018/0269939 A1* | 9/2018 | Hu | H04B 7/0617 |
| 2019/0052334 A1* | 2/2019 | Jeon | H04B 7/0626 |
| 2019/0053171 A1* | 2/2019 | Jung | H04W 52/16 |
| 2019/0357274 A1* | 11/2019 | Lee | H04W 16/28 |
| 2020/0244413 A1* | 7/2020 | Takeda | H04B 7/10 |
| 2021/0051707 A1* | 2/2021 | Rastegardoost | H04W 72/23 |
| 2022/0272760 A1* | 8/2022 | Murray | H04W 74/0833 |
| 2022/0346157 A1* | 10/2022 | Wang | H04W 74/0833 |

OTHER PUBLICATIONS

Ghosh et al., "NR Radio Interface for 5G Verticals", Feb. 7, 2020, Nokia Bell Labs, Naperville, IL, USA (Year: 2020).*

(Continued)

*Primary Examiner* — Justin T Van Roie
(74) *Attorney, Agent, or Firm* — ArentFox Schiff LLP

(57) ABSTRACT

Aspects described herein relate to a user equipment (UE) determining a reference signal port of multiple configured reference signal ports to use in transmitting a reference signal for a random access message. In one aspect, a configuration indicating multiple reference signal ports to use in transmitting reference signals for a random access message can be transmitted to the UE, as well as an indication of a reference signal port of the multiple reference signal ports to be used in transmitting a reference signal for the random access message.

30 Claims, 7 Drawing Sheets

(56) References Cited

OTHER PUBLICATIONS

3GPP TS 38.213 V16.1.0 (Mar. 2020); 3rd Generation Partnership Project; Technical Specification Group Radio Access Network; NR; Physical layer procedures for control (Release 16) (Year: 2020).*
3GPP TS 38.321 V16.0.0 (Mar. 2020); 3rd Generation Partnership Project; Technical Specification Group Radio Access Network; NR; Medium Access Control (MAC) protocol specification (Release 16) (Year: 2020).*

* cited by examiner

| | | | | | | | |
|---|---|---|---|---|---|---|---|

| R | Timing Advance Command | Oct 1 |
|---|---|---|
| Timing Advance Command | UL Grant | Oct 2 |
| UL Grant | | Oct 3 |
| UL Grant | | Oct 4 |
| UL Grant | | Oct 5 |
| Temporary C-RNTI | | Oct 6 |
| Temporary C-RNTI | | Oct 7 |

FIG. 7

TECHNIQUES FOR CONFIGURING REFERENCE SIGNALS FOR RANDOM ACCESS MESSAGES IN WIRELESS COMMUNICATIONS

CLAIM OF PRIORITY UNDER 35 U.S.C. § 119

The present Application for Patent claims priority to Provisional Patent Application No. 63/020,874, entitled "TECHNIQUES FOR CONFIGURING REFERENCE SIGNALS FOR RANDOM ACCESS MESSAGES IN WIRELESS COMMUNICATIONS" filed May 6, 2020, which is assigned to the assignee hereof and hereby expressly incorporated by reference herein for all purposes.

BACKGROUND

Aspects of the present disclosure relate generally to wireless communication systems, and more particularly, to random access procedures.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as fifth generation (5G) new radio (NR), and in certain cases, message 3 in a four-step random access procedure, and/or corresponding demodulation reference signal (DMRS) are transmitted on DMRS antenna port zero (0) by any given user equipment (UE).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided. The apparatus includes a transceiver, a memory configured to store instructions, and one or more processors communicatively coupled with the memory and the transceiver. The one or more processors are configured to receive, from a base station, a configuration indicating multiple reference signal ports to use in transmitting reference signals for a random access message, and transmit, to the base station, a reference signal for the random access message based on a reference signal port of the multiple reference signal ports.

In another aspect, an apparatus for wireless communication is provided that includes a transceiver, a memory configured to store instructions, and one or more processors communicatively coupled with the memory and the transceiver. The one or more processors are configured to transmit, to a user equipment (UE), a configuration indicating multiple reference signal ports to use in transmitting reference signals for a random access message, and indicate, to the UE, a reference signal port of the multiple reference signal ports to be used in transmitting a reference signal for the random access message.

In another aspect, a method for wireless communication is provided that includes receiving, from a base station, a configuration indicating multiple reference signal ports to use in transmitting reference signals for a random access message, and transmitting, to the base station, a reference signal for the random access message based on a reference signal port of the multiple reference signal ports.

In yet another aspect, a method for wireless communication is provided that includes transmitting, to a UE, a configuration indicating multiple reference signal ports to use in transmitting reference signals for a random access message, and indicating, to the UE, a reference signal port of the multiple reference signal ports to be used in transmitting a reference signal for the random access message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 7 illustrates an example of a RA response message format, in accordance with various aspects of the present disclosure.

DETAILED DESCRIPTION

Figure 1:
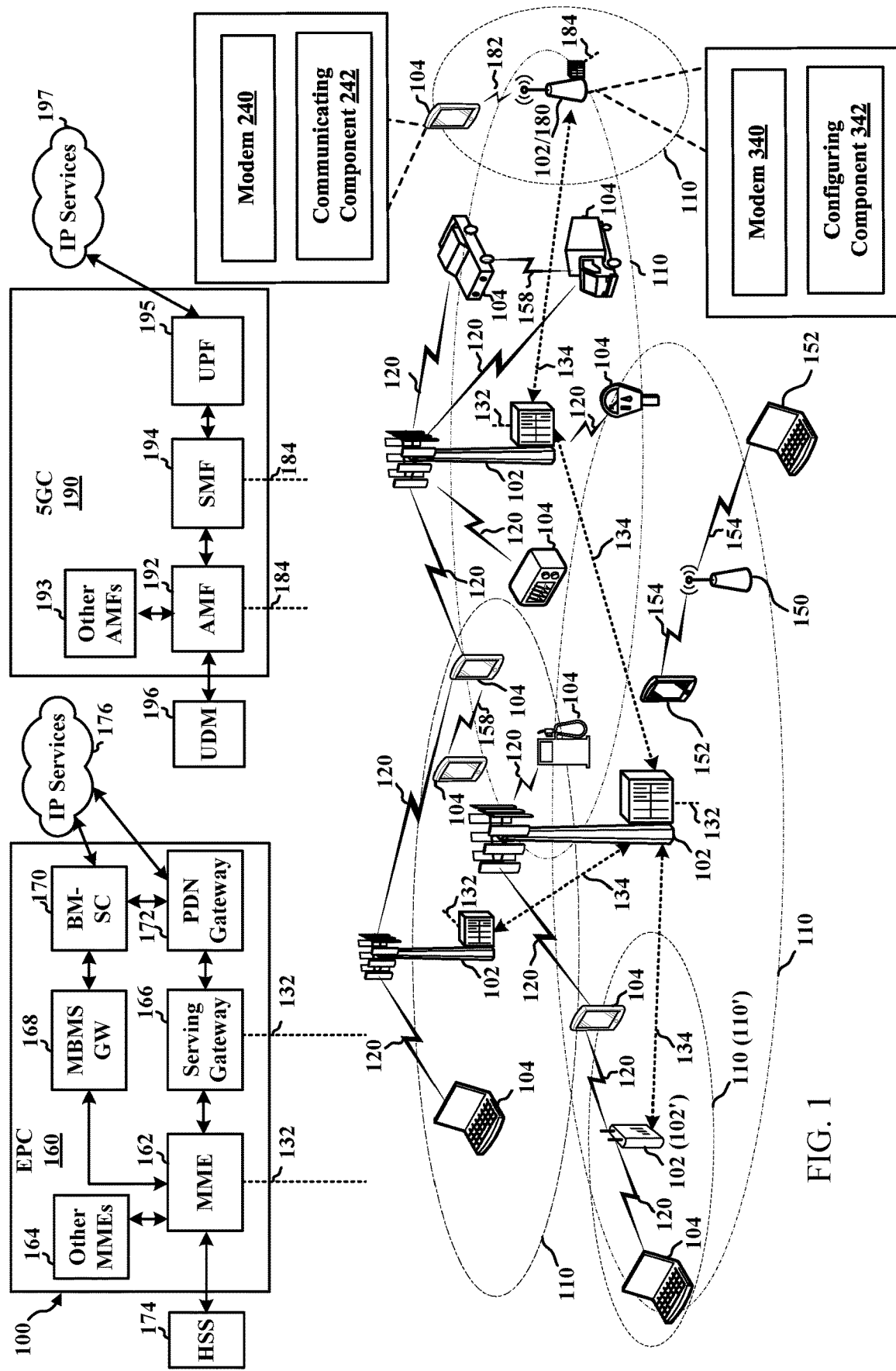
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring user equipment (UE) or other devices to transmit reference signals (RSs) for a random access (RA) message using one of multiple configured RS ports. In this regard, for example, RSs of multiple UEs can be multiplexed (e.g., code division multiplexed (CDMed), frequency division multiplexed (FDMed), etc.) using different RS ports, which can enhance performance of communications by allowing multiple UEs to transmit RA messages and/or associated RSs at the same time. Certain aspects are described with respect to a four-step random access procedure, which can include a first message (msg1) including a random access preamble transmitted by a UE to a base station or other network device over indicated random access channel (RACH) resources, a second message (msg2, also referred to herein as random access response (RAR)) transmitted by the base station or other network device to the UE to acknowledge msg1 and/or provide resources for a third message (msg3), the third message (msg3) transmitted by the UE to the base station or other network device over data channel resources (e.g., physical uplink shared channel (PUSCH) resources) indicated by the RAR, and/or a fourth message (msg4) transmitted by the base station or other network device to the UE, which may include contention resolution information.

In some wireless communication technologies, such as fifth generation (5G) new radio (NR), current demodulation reference signal (DMRS) configurations received by the UE have multiple ports that can be either CDMed or FDMed, where CDMed ports may suffer from performance degradation with the usage of higher subcarrier spacing (SCS), especially with large delay spread. As the modulation and coding scheme (MCS) configured for UE communications increases, the sensitivity of the communications to channel estimation errors can increase. With low MCS, CDMed different DMRS ports may achieve reasonable performance. Currently, in 5G NR, for the third random access message (msg3) in a four-step random access procedure, UEs always use port 0 and assume the other comb is empty for PUSCH transmission. Specifically, in 5G NR, when transmitted PUSCH is neither scheduled by downlink control information (DCI) format 0_1 with cyclic redundancy check (CRC) scrambled by cell radio network temporary identifier (C-RNTI), configured scheduling RNTI (CS-RNTI), semi-persistent channel state information RNTI (SP-CSI-RNTI) or modulation and coding scheme C-RNTI (MCS-C-RNTI), nor corresponding to a configured grant, nor being a PUSCH for Type-2 random access procedure, the UE uses single symbol front-loaded DMRS of configuration type 1 on DMRS port 0. In addition, in this case, the remaining resource elements (REs) not used for DMRS in the symbols are not used for any PUSCH transmission.

In addition, in a specific example in 5G NR, for uplink grants in random access response (RAR), the msg3 grant can be as follows (as described in third generation partnership project (3GPP) technical specification (TS) 38.213, section 8.2):

| RAR Grant Field | Number of bits |
|---|---|
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| Transmit power control (TPC) command for PUSCH | 3 |
| Channel state information (CSI) request | 1 |
| ChannelAccess-CPext | 0, for operation without shared spectrum channel access<br>2, for operation with shared spectrum channel access |

In addition, in this specific example in 5G NR, the format of media access control (MAC) RAR, as described in 3 GPP 38.213, section 6.2.3, has seven octets of fairly packed bits, and only one reserved bit. In this regard, the present MAC RAR structure may not allow for much versatility to request or enable msg3 transmission on a different port, as there may not be enough bits in the MAC RAR to indicate the different port. In some aspects described herein, however, at least the reserved bit may be used to differential RS ports.

Aspects described herein relate to configuring other RS ports (e.g., other than only DMRS port 0) for transmitting RSs related to RA messages to allow multiplexing of the RSs and/or associated RA messages. In an example, a base station can configure multiple RS ports for a UE to use in transmitting RSs for RA messages. The UE can determine or otherwise select which of the multiple RS ports to use in transmitting an RS for a RA message based on one or more parameters or other considerations. For example, the base station can indicate which of the multiple RS ports the UE is to use in transmitting the RS for the RA. In another example, the UE can determine which of the multiple RS ports to use based on parameters configured by the base station, etc. Enabling UEs to use different RS ports for transmitting the RSs can allow for multiplexing of the RSs related to the RA messages (e.g., at least for msg3 in a four-step random access procedure). In an example, this can improve reliability or likelihood of success of random access procedures, which can improve throughput of communications in a wireless communication network, etc.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining an RS port for transmitting a RS corresponding to a RA message, in accordance with aspects described herein. In addition, some nodes may have a modem 340 and configuring component 342 for configuring a device for determining an RS port for transmitting a RS corresponding to a RA message, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link)

transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can determine one of multiple RS ports for transmitting a RS associated with a RA message and can transmit the RS based on the RS port. For example, communicating component 242 can be configured with the multiple RS ports (e.g., from configuring component 342 of a base station 102) and can determine which of the multiple RS ports to use in transmitting the RS based on an indication from the base station 102 (e.g., from configuring component 342), one or more parameters indicated by the base station 102 (e.g., from configuring component 342), one or more other parameters related to transmitting the RS, and/or the like. In this regard, for example, multiple UEs 104 can multiplex RSs for RA messages using different RS ports.

Figure 2:
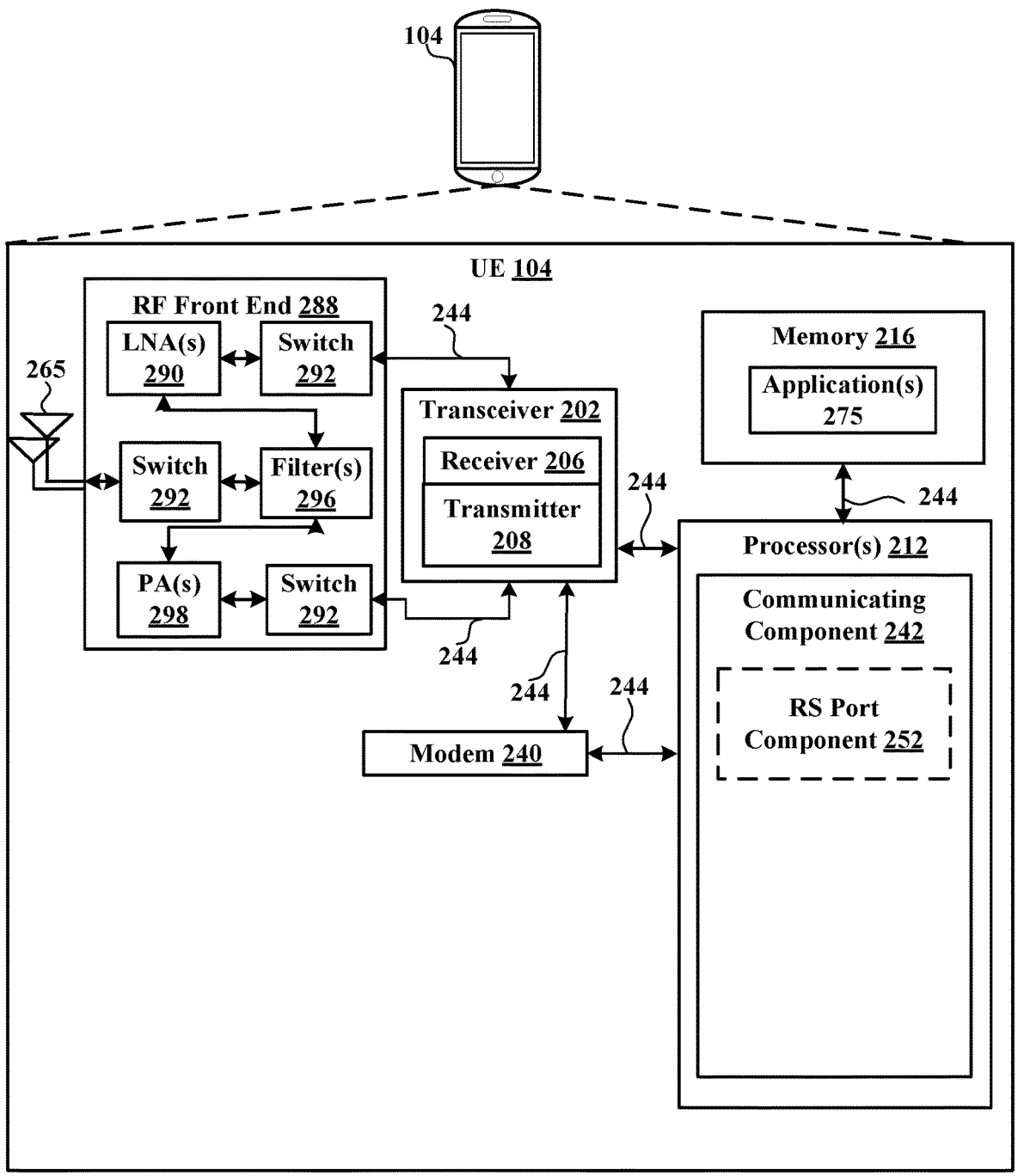
FIG. 2 is a block diagram illustrating an example of a UE, in accordance with various aspects of the present disclosure.
Figure 3:
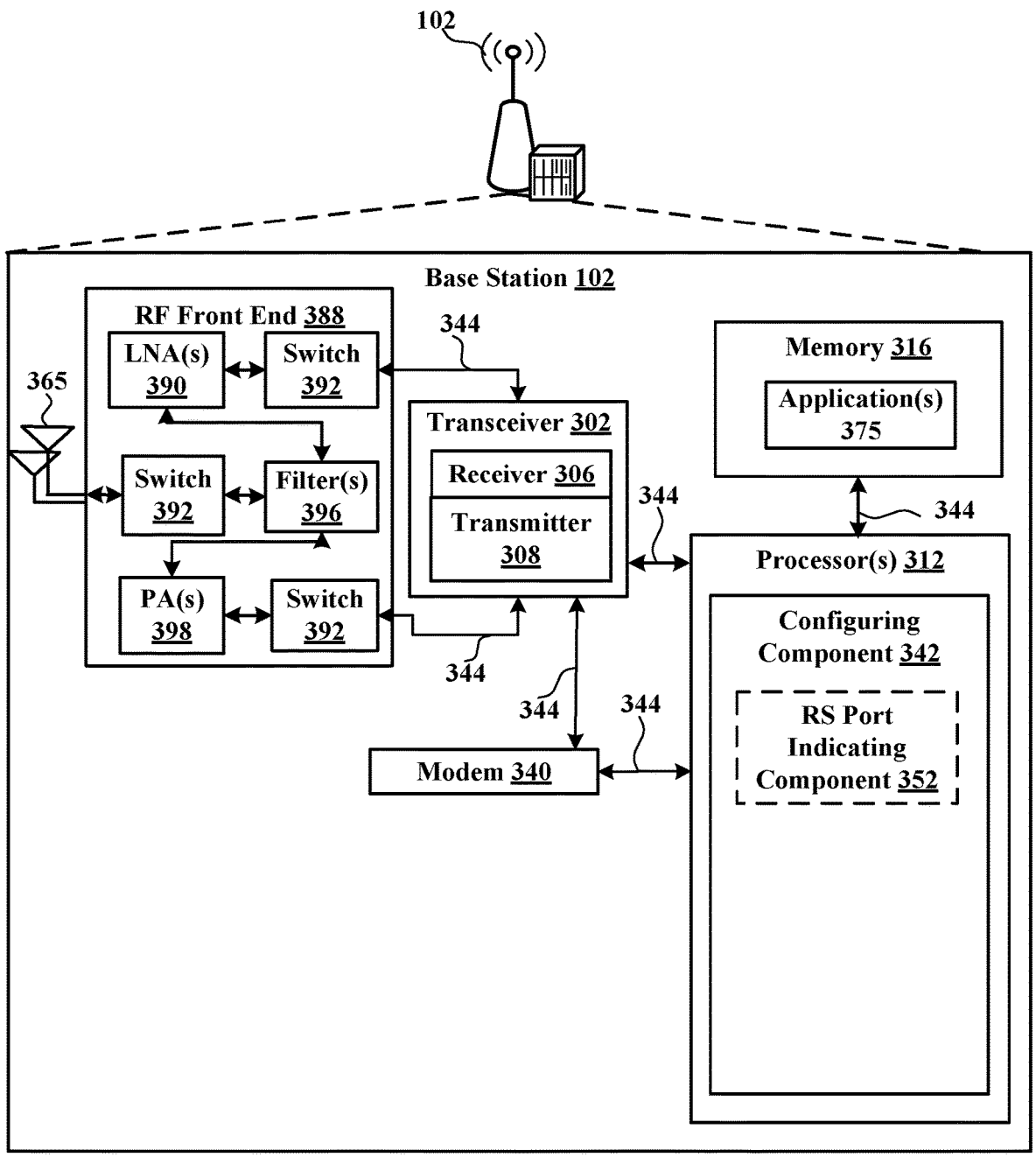
FIG. 3 is a block diagram illustrating an example of a base station, in accordance with various aspects of the present disclosure.
Figure 4:
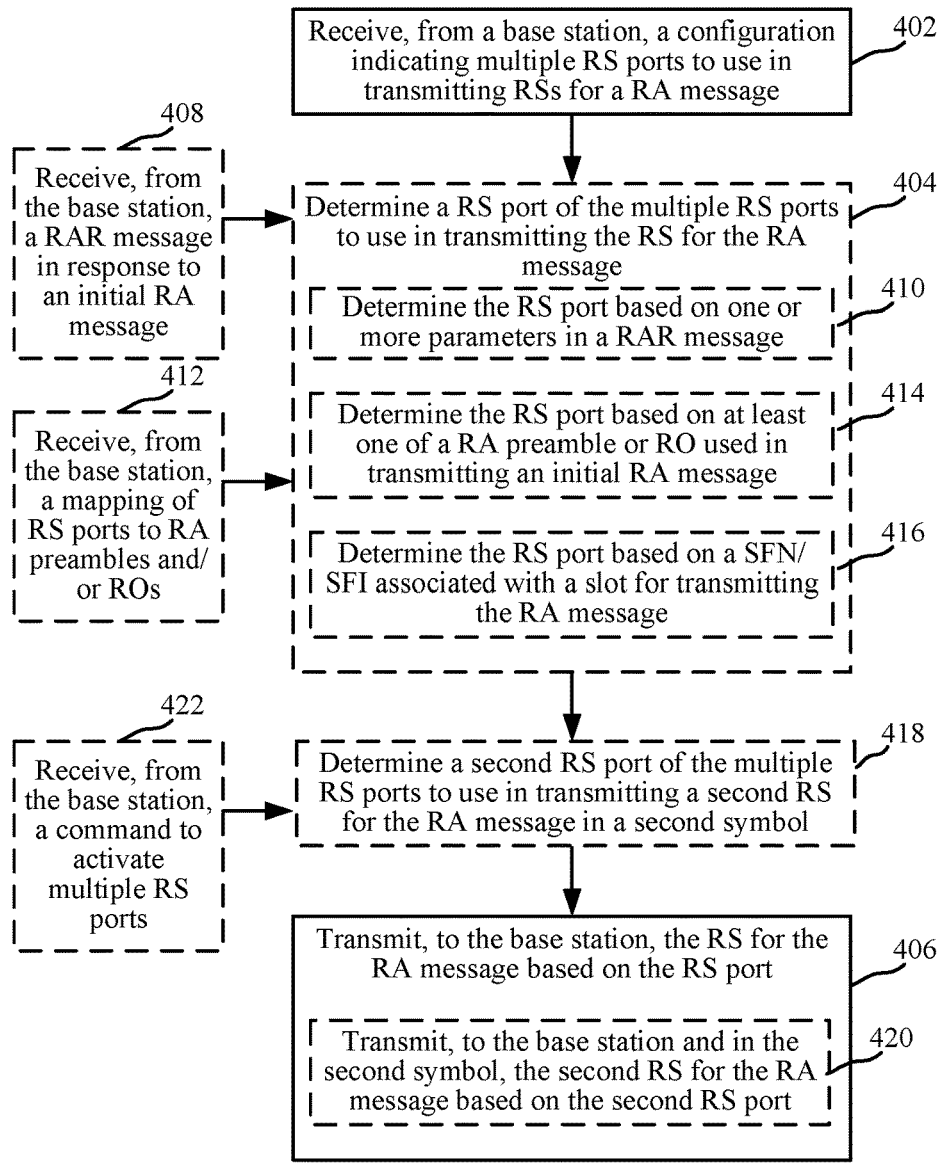
FIG. 4 is a flow chart illustrating an example of a method for determining a reference signal (RS) port to use in transmitting a RS for a random access (RA) message, in accordance with various aspects of the present disclosure.
Figure 5:
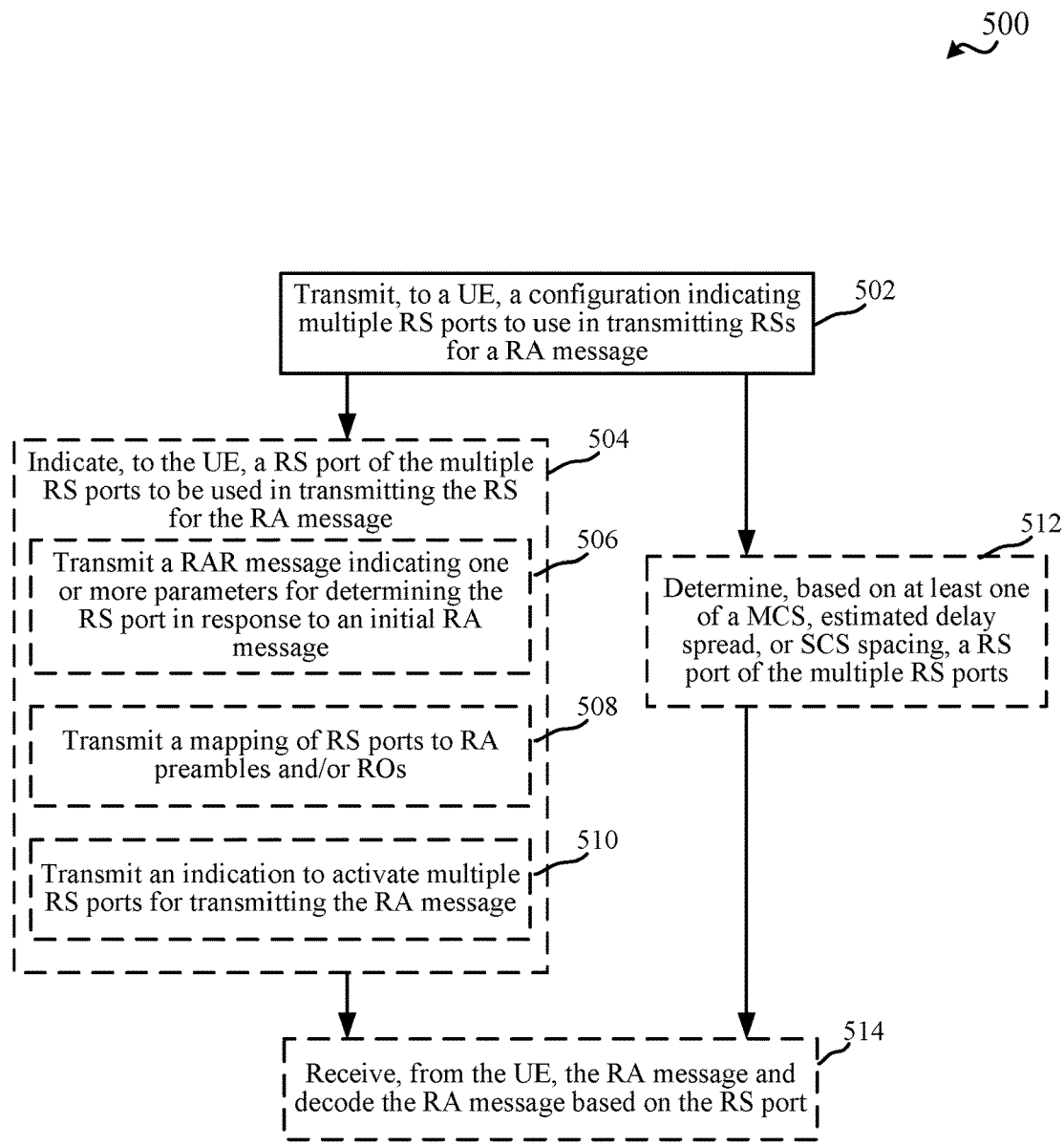
FIG. 5 is a flow chart illustrating an example of a method for configuring a device for determining a RS port to use in transmitting a RS for a RA message, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining an RS port for transmitting a RS corresponding to a RA message, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a RS port component 252 for using, determining, or otherwise selecting one of multiple RS ports for transmitting a RS for a RA message, in accordance with aspects described herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a device for determining an RS port for transmitting a RS corresponding to a RA message, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a RS port indicating component 352 for indicating one of multiple RS ports to be used in transmitting a RS for a RA message, in accordance with aspects described herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for determining a RS port for transmitting a RS for a RA message, in accordance with aspects described herein. FIG. 5 illustrates a flow chart of an example of a method 500 for configuring a device to determine an RS port for transmitting a RS for a RA message, in accordance with aspects described herein. In an example, a UE 104 can perform the functions described in method 400 using one or more of the components described in FIGS. 1 and 2. In an example, a base station 102 can perform the functions described in method 500 using one or more of the components described in FIGS. 1 and 3. Methods 400 and 500 are described below in conjunction with one another to ease explanation of the associated functions and concepts. Methods 400 and 500 are not required to be performed in conjunction with one another, and indeed one device can be configured to perform method 400 without having a corresponding device that performs method 500 and vice versa, in at least one example.

In method 400, at Block 402, a configuration indicating multiple RS ports to use in transmitting RSs for a RA message can be received from a base station. In an aspect, communicating component 242, e.g., in conjunction with processor(s) 212, memory 216, transceiver 202, etc., can receive, from the base station (e.g., base station 102) or another network device, the configuration indicating multiple RS ports to use in transmitting RSs for a RA message. For example, communicating component 242 can receive the configuration in system information broadcast or transmission (e.g., remaining minimum system information (RMSI) as defined in 5G NR), in radio resource control (RRC) signaling, etc. from (transmitted by) the base station 102. In an example, the configuration can indicate RS ports that may be used for transmitting RSs for RA messages. The RS ports can be indicated by a port index and may refer to one of multiple antenna ports on the UE 104.

In a specific example, the configuration may include an indication of a CDM group of antenna ports that can be used for transmitting RSs for a RA message. For example, multiple CDM groups can be previously configured in another configuration (e.g., stored in memory 216 of the UE 104 or received from the base station 102, etc.) having associated identifiers, and the configuration received at Block 402 may include one or more of the identifiers. In this or another example, the configuration may include an identifier that maps to a pair or group of ports that can be CDMed. For example, the indication may be a msg3PUSCHDMRSCDMgroup value indicating the CDM group of RS ports that can be CDMed for transmitting msg3 PUSCH in a four-step random access procedure. In another specific example, the configuration may include an indication of a number of antenna ports that can be used for transmitting RSs for a RA message (e.g., 2, 4, etc.), and the communicating component 242 can be configured to determine which antenna ports correspond to the indicated number of ports. For example, the indication may be a msg3PUSCHNrOfPort value indicating the number of RS ports. In another specific example, the configuration may include an indication of a DMRS configuration for msg3 transmission, e.g., as a msg3DMRSConfiguration value, and communicating component 242 can be configured to determine the RS ports based on the indicated DMRS configuration.

In method 500, at Block 502, a configuration indicating the multiple RS ports to use in transmitting RSs for a RA message can be transmitted to a UE. In an aspect, configuring component 342, e.g., in conjunction with processor(s) 312, memory 316, transceiver 302, etc., can transmit, to the UE, the configuration indicating the multiple RS ports to use in transmitting RSs for the RA message. For example, configuring component 342 can transmit the configuration to the UE 104 in RMSI or other system information signaling, RRC signaling, etc., as described, which may indicate the RS ports or parameters for determining the RS ports (e.g., msg3PUSCHDMRSCDMgroup, msg3PUSCHNrOfPort, msg3DMRSConfiguration, etc.).

In method 400, optionally at Block 404, a RS port of the multiple RS ports to use in transmitting the RS for the RA message can be determined. In an aspect, RS port component 252, e.g., in conjunction with processor(s) 212, memory 216, transceiver 202, communicating component 242, etc., can determine, or otherwise select, the RS port of the multiple RS ports to use in transmitting the RS for the RA message. For example, RS port component 252 can determine one of the RS ports from the multiple configured RS ports based on one or more parameters or other considerations, as described further herein. In one example, the one or more parameters can be indicated to the UE 104 by the base station 102 or otherwise determined by the UE 104. In one example, where communicating component 242 determines that the indication of multiple RS ports is not received from the base station 102 (e.g., not received in the RMSI or other configuration), communicating component 242 can determine to use a certain RS port and/or configuration for transmitting the RS for the RA message (e.g., RS port 0 from DMRS configuration type 1, as defined in 5G NR).

Thus, in one example, in method 500, at Block 504, a RS port of the multiple RS ports to be used in transmitting the RS for the RA message can be indicated to the UE. In an aspect, RS port indicating component 352, e.g., in conjunction with processor(s) 312, memory 316, transceiver 302, configuring component 342, etc., can indicate, to the UE (e.g., UE 104), the RS port of the multiple RS ports to be used in transmitting the RS for the RA message. RS port indicating component 352 can indicate the RS port in one or more explicit or implicit parameters (e.g., parameter values of parameters). In one example, optionally at Block 506, a random access response (RAR) message can be transmitted indicating one or more parameters for determining the RS port in response to an initial RA message. In an aspect, RS port indicating component 352, e.g., in conjunction with processor(s) 312, memory 316, transceiver 302, configuring component 342, etc., can transmit the RAR message indicating one or more parameters for determining the RS port in response to the initial RA message.

For example, the UE 104 can transmit an initial RA message, such as a RA preamble (referred to as msg1 in the four-step random access procedure), to the base station 102, and the base station 102 can respond with the RAR message (referred to as msg2 in the four-step random access procedure). The RAR message may indicate, among other parameters, resources of a physical downlink control channel (PDCCH) communication, or other control data, intended for the UE 104. In one example, the RAR message can have a format such as that shown in FIG. 7

In one example, RS port indicating component 352 can use the reserved bit "R" of the RAR message, as shown in FIG. 7 for example, to indicate the RS port to use in transmitting the RS for msg3 (e.g., where there are two possible RS ports in the multiple RS ports).

For example, in method 400, optionally at Block 408, a RAR message can be received from the base station in response to an initial RA message. In an aspect, RS port component 252, e.g., in conjunction with processor(s) 212, memory 216, transceiver 202, communicating component 242, etc., can receive, from the base station, the RAR message in response to the initial RA message. As described, for example, communicating component 242 can transmit the initial RA message to the base station 102 as a RA preamble (e.g., msg1), and can receive the RAR message (e.g., msg2) from the base station as part of the four-step random access procedure. In addition, for example, in determining the RS port at Block 404, optionally at Block 410, the RS port can be determined based on one or more parameters in the RAR message. In an aspect, RS port component 252, e.g., in conjunction with processor(s) 212, memory 216, transceiver 202, communicating component 242, etc., can determine the RS port based on the one or more parameters in the RAR message. For example, RS port component 252 can determine the RS port based on the reserved bit "R" in the RAR message (e.g., the bit can be used to indicate one of two RS ports based on a first bit value or to indicate a different one of the two RS ports based on a second bit value). In an example, this can be based on an assumption that the other one of the two RS ports is assigned to another UE for transmitting its RS for RA message. In addition, the two RS ports can be configured to the UE 104 in RRC signaling, broadcast or system information signaling, etc. or otherwise stored in the UE 104 (e.g., in memory 216), and RS port component 252 can select among the two based on the reserved bit value.

In other examples, the RAR message can include a PDCCH (or resources for receiving and decoding a PDCCH). In an example, the PDCCH can indicate the RS port to use for the RA message. In an example, the PDCCH associated with the RAR message can include up to 14 reserved bits that can be used. In an example, each subset of bits can be dedicated to signal the port index to UEs with subset of preambles. Depending on the total number of allowed ports under each configuration type additional granularity may be achieved. In any case, for example, RS port indicating component 352 can indicate the RS port using the bits of the PDCCH, and/or RS port component 252 can determine the RS port based on the bits of the PDCCH, where the bits can specify an index of the RS port, or a value otherwise mapped to the RS port. In yet another example, the RS port can be determined based on a modulation and coding scheme (MCS), estimated delay spread, subcarrier spacing (SCS), and/or a combination thereof, which can be indicated in the PDCCH, downlink control information (DCI) associated with the PDCCH, etc. of the RAR message. Accordingly, RS port indicating component 352 and/or RS port component 252 can determine the RS port based on one or more of these values associated with the PDCCH, DCI, etc. of the RAR message.

In one example, in indicating the RS port at Block 504, optionally at Block 508, a mapping of RS ports to RA preambles and/or random access occasions (ROs) can be transmitted. In an aspect, RS port indicating component 352, e.g., in conjunction with processor(s) 312, memory 316, transceiver 302, configuring component 342, etc., can transmit, to the UE, the mapping of RS ports to RA preambles and/or ROs. For example, ROs can include defined occasions (e.g., resources) during which to transmit RA preambles. Configuring component 342 can define various ROs and/or RA preambles that can be transmitted in the ROs (e.g., specific RA preambles for certain ROs or more generally RA preambles that can be transmitted over any ROs, etc.). In any case, UEs can determine ROs for transmitting RA preambles based on configuration by the base station 102 (e.g., in system information or other broadcast signaling). In this example, RS port indicating component 352 can map at least a portion of at least one of the RA preambles, the ROs, or a combination thereof, to RS ports to be used in transmitting RS for the RA message based on the RA preamble, RO, or combination thereof selected by the UE 104. In an example, RS port indicating component 352 can transmit the mapping to the UE in RRC signaling. In another example, mapping of RS port to RA preamble, RO, or combination thereof can be hardcoded in the base station 102 and/or the UE 104. In either case, the UE 104 can determine the RS port to use based on the RA preamble or RO (or both), as can the base station 102 to determine the RS port based on which the RS is being transmitted by the UE 104.

For example, in method 400, optionally at Block 412, a mapping of RS ports to RA preambles and/or ROs can be received from the base station. In an aspect, RS port component 252, e.g., in conjunction with processor(s) 212, memory 216, transceiver 202, communicating component 242, etc., can receive, from the base station, the mapping of RS ports to RA preambles and/or ROs. As described, for example, RS port component 252 can receive the configuration in RRC signaling, broadcast or system information signaling, etc. from the base station 102. In another example, the mapping can be hardcoded in the UE 104 (e.g., in memory 216), as described above. In either case, for example, in determining the RS port at Block 404, optionally at Block 414, the RS port can be determined based on at least one of a RA preamble or RO used in transmitting an initial RA message. In an aspect, RS port component 252, e.g., in conjunction with processor(s) 212, memory 216, transceiver 202, communicating component 242, etc., can determine the RS port based on at least one of the RA preamble or RO used in transmitting the initial RA message. For example, communicating component 242 can select a RA preamble and/or RO for transmitting msg1 to the base station 102, which may be based on one or more other parameters, an indication received from the base station 102, etc. In this example, RS port component 252 can then determine the RS port that maps to the selected RA preamble, RO, or both in the mapping.

In another example, in determining the RS port at Block 404, optionally at Block 416, the RS port can be determined based on a system frame number (SFN) or slot format indicator (SFI) associated with a slot for transmitting the RA message. In an aspect, RS port component 252, e.g., in conjunction with processor(s) 212, memory 216, transceiver 202, communicating component 242, etc., can determine the RS port based on the SFN or SFI associated with a slot for transmitting the RA message. For example, RS port component 252 can determine the msg3 transmission on slot 0 may map to a first RS port (e.g., port 0) while msg3 transmission on slot 1 may map to a second RS port (e.g., port 1). For example, RS port component 252 can determine that even numbered SFNs or SFIs map to a first RS port and odd numbered SFNs or SFIs map to a second RS port, etc. In one example, this determination of RS port or whether to switch between RS ports, by the RS port component 252, may be conditioned on whether msg3 hopping is enabled or not (e.g., by configuration from the base station 102). For example, RS port component 252 may determine different RS ports for different SFNs or SFIs where frequency hopping is enabled.

In an example, in method 400, optionally at Block 418, a second RS port of the multiple SR ports can be determined to use in transmitting a second RS for the RA message in a second symbol. In an aspect, RS port component 252, e.g., in conjunction with processor(s) 212, memory 216, transceiver 202, communicating component 242, etc., can determine the second RS port of the multiple RS ports to use in transmitting the second RS for the RA message in a second symbol. For example, in this regard, the port mapping can vary for additional RS symbol for transmitting RS for the RA message (e.g., transmitting DMRS on msg3). For example, RS port component 252 may determine that the first msg3 DMRS may map to port 0 while the second msg3 DMRS may map to port 2, etc. This can be hardcoded or RRC configured (e.g., by the base station 102). For example, if msg3 PUSCH has two DMRS symbols and the first one is scheduled with a first port (e.g., port 0), then the RS port component 252 can assume a different port (e.g., port 2) is scheduled on the second symbol. In this example, communicating component 242 may only transmit the RS based on one of the RS ports (e.g., the RE allocations on the first symbol to follow the ones of RS port 0 while those of the second symbol follow the ones of RS port 2). In an example, this may be in conjunction with one or more of the other determinations described herein (e.g., determine the first RS port based on reserved value "R" in RAR message, RA preamble, RO, or combination thereof, SFN/SFI, etc., and then determine the second RS port as the other RS port where two RS ports are configured).

In this example, in transmitting the RS for the RA message at Block 406, optionally at Block 420, the second RS for the RA message can be transmitted to the base station and in the second symbol based on the second RS port. In an aspect, communicating component 242, e.g., in conjunction with processor(s) 212, memory 216, transceiver 202, etc., can transmit, to the base station and in the second symbol, the second RS for the RA message based on the second RS port. For example, communicating component 242 can transmit the second RS in the second symbol instead of transmitting the RS determined at Block 404. In this regard, the UE 104 can transmit one of multiple RSs for the RA message, where each RS may be based on different RS port, in one example.

In one example, this functionality may be activated by RRC or MAC-CE and/or may be conditioned on whether msg3 hopping (e.g., frequency hopping for msg3 across time periods) is enabled or not. For example, in indicating the RS port at Block 504, optionally at Block 510, an indication to activate multiple RS ports for transmitting the RA message can be transmitted. In an aspect, RS port indicating component 352, e.g., in conjunction with processor(s) 312, memory 316, transceiver 302, configuring component 342, etc., can transmit the indication to activate multiple RS ports for transmitting the RA message. For example, RS port indicating component 352 can transmit the indication using RRC signaling, MAC-CE, etc., as described. In addition, for example, in method 400, optionally at Block 422, a command to activate multiple RS ports can be received from the base station. In an aspect, RS port component 252, e.g., in conjunction with processor(s) 212, memory 216, transceiver 202, communicating component 242, etc., can receive, from the base station, the command to activate multiple RS ports. For example, RS port component 252 can receive the command from the base station 102 in RRC signaling, MAC-CE, etc., and can accordingly determine at least the second RS port (and/or additional RS ports for additional RSs) based on receiving the command.

In method 500, optionally at Block 512, a RS port of the multiple RS ports can be determined based on at least one of a MCS, estimated delay spread, SCS spacing, or a combination thereof. In an aspect, configuring component 342, e.g., in conjunction with processor(s) 312, memory 316, transceiver 302, etc., can determine, based on at least one of a MCS, estimated delay spread, SCS spacing, or a combination thereof, a RS port of the multiple RS ports used by the UE in transmitting the RS for the RA message. For example, the MCS, estimated delay spread, SCS spacing, etc. can correspond to a PDCCH associated with the RAR message that configuring component 342 can configure for the UE 104 and/or can transmit to the UE 104 (e.g., in a RAR message in response to an initial RA message), as described above.

In method 500, optionally at Block 514, the RA message can be received from the UE and decoded based on the RS port. In an aspect, configuring component 342, e.g., in conjunction with processor(s) 312, memory 316, transceiver 302, etc., can receive, from the UE, the RA message and decode the RA message based on the RS port. For example, configuring component 342 can use the RS port (e.g., of the DMRS) for channel estimation to decode data (e.g., the PUSCH) transmitted over the port. This can allow for multiplexing multiple UEs using different RS ports, as described.

Figure 6:
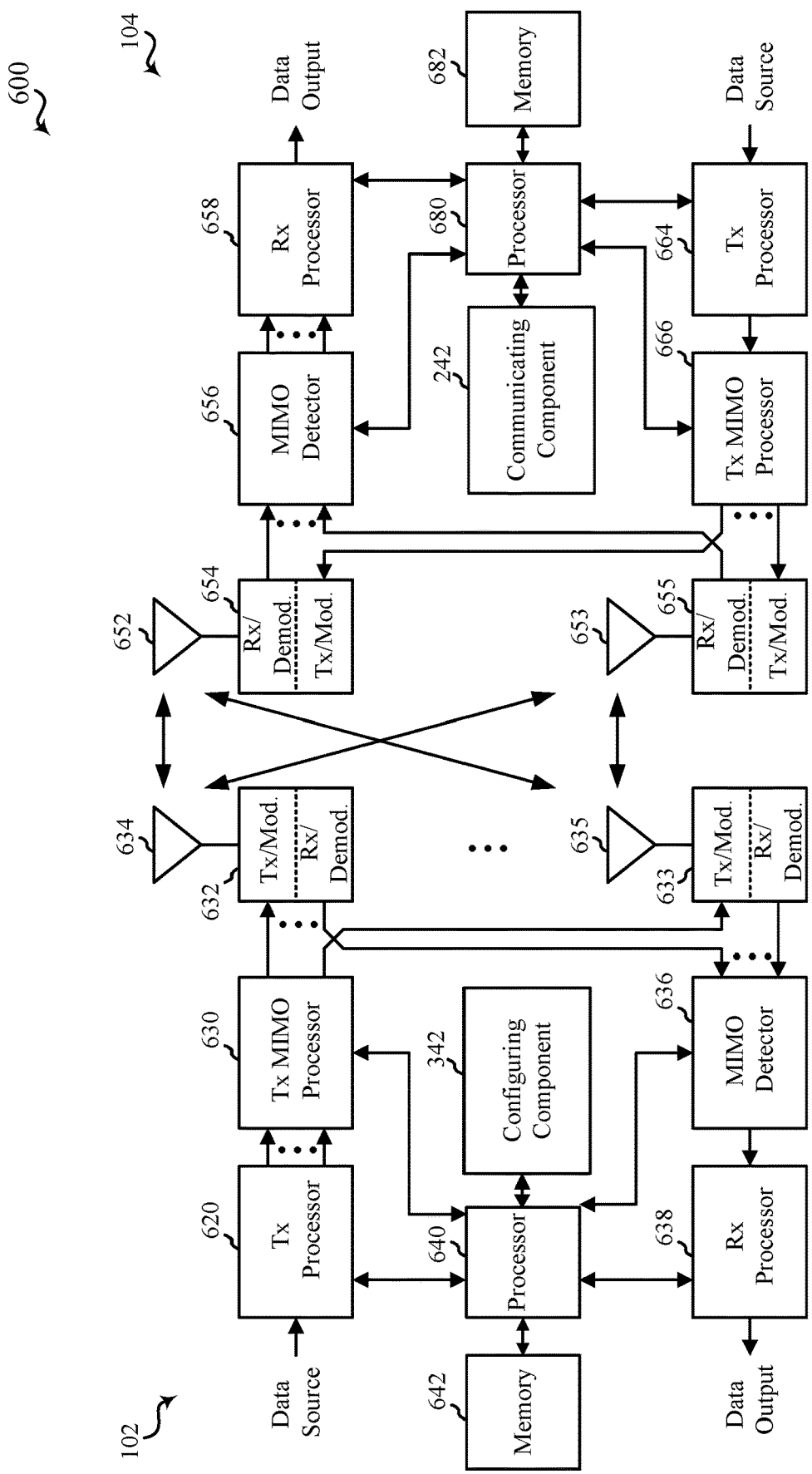
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols.

A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a configuring component 342 (see e.g., FIGS. 1 and 3).

The following aspects are illustrative only and aspects thereof may be combined with aspects of other embodiments or teaching described herein, without limitation.

Aspect 1 is a method for wireless communication including receiving, from a base station, a configuration indicating multiple reference signal ports to use in transmitting reference signals for a random access message, determining a reference signal port of the multiple reference signal ports to use in transmitting a reference signal for the random access message, and transmitting, to the base station, the reference signal for the random access message based on the reference signal port.

In Aspect 2, the method of Aspect 1 includes receiving, from the base station, a random access response message in response to an initial random access message, where determining the reference signal port is based on a parameter value in the random access response message.

In Aspect 3, the method of any of Aspects 1 or 2 includes where determining the reference signal port is based at least in part on determining at least one of a random access preamble, a random access occasion used in transmitting an initial random access message, or a combination thereof.

In Aspect 4, the method of Aspect 3 includes where determining the reference signal port is based at least in part on determining a mapping of the reference signal port to at least one of the random access preamble, the random access occasion, or the combination thereof.

In Aspect 5, the method of Aspect 4 includes receiving the mapping as part of a mapping configuration of mappings between the multiple reference signal ports and multiple random access preambles or random access occasions.

In Aspect 6, the method of Aspect 5 includes receiving the mapping configuration from the base station.

In Aspect 7, the method of any of Aspects 1 to 5 includes determining a first reference signal port of the multiple reference signal ports to use in transmitting a first reference signal for the random access message and a second reference signal port of the multiple reference signal ports to use in transmitting a second reference signal for the random access message, where transmitting the reference signal includes transmitting, to the base station, one of the first reference signal for the random access message based on the first reference signal port or the second reference signal for the random access message based on the second reference signal port.

In Aspect 8, the method of Aspect 7 includes where determining the second reference signal port is based on determining that multiple reference signal ports are configured.

In Aspect 9, the method of any of Aspects 7 or 8 includes where determining the second reference signal port is based on determining to activate multiple reference signal ports based on a command received from the base station.

In Aspect 10, the method of any of Aspects 7 to 9 includes where determining the second reference signal port is based on determining that hopping is configured for the random access message.

In Aspect 11, the method of any of Aspects 1 to 10 includes where determining the reference signal port is based at least in part on a determining a SFN or SFI associated with a slot for transmitting the random access message.

In Aspect 12, the method of Aspect 11 includes where determining the reference signal port based at least in part on the SFN or SFI is based on determining that hopping is configured for the random access message.

In Aspect 13, the method of any of Aspects 1 to 12 includes receiving, from the base station, a random access response message in response to an initial random access message, where the random access response message includes a control channel that indicates a port index of the reference signal port, where determining the reference signal port is based on the port index.

In Aspect 14, the method of any of Aspects 1 to 13 includes where determining the reference signal port is based on at least one of a MCS, an estimated delay spread, a SCS indicated for the random access message, or a combination thereof.

Aspect 15 is a method for wireless communication including transmitting, to a UE, a configuration indicating multiple reference signal ports to use in transmitting reference signals for a random access message, and indicating, to the UE, a reference signal port of the multiple reference signal ports to be used in transmitting a reference signal for the random access message.

In Aspect 16, the method of Aspect 15 includes where indicating the reference signal port includes transmitting random access response message in response to an initial random access message, where the random access response message includes a parameter value indicating the reference signal port.

In Aspect 17, the method of any of Aspects 15 or 16 includes where indicating the reference signal port comprises transmitting, to the UE, a mapping of reference signal ports to at least one of random access preambles, random access occasions, or a combination thereof.

In Aspect 18, the method of any of Aspects 15 to 17 includes where indicating the reference signal port includes transmitting, to the UE, an indication to activate multiple reference signal ports for transmitting the random access message.

In Aspect 19, the method of any of Aspect 15 to 18 includes where indicating the reference signal port includes transmitting, to the UE, a random access response message in response to an initial random access message, where the random access response message includes a control channel that indicates a port index of the reference signal port.

Aspect 20 is a method for wireless communication including transmitting, to a UE, a configuration indicating multiple reference signal ports to use in transmitting a reference signal for a random access message, determining, based on at least one of a MCS, an estimated delay spread, a SCS, or a combination thereof, indicated for the random access message, a reference signal port of the multiple reference signal ports, and decoding the random access message received from the UE based on the reference signal port.

Aspect 21 is a method for wireless communication including receiving, from a base station, a configuration indicating multiple reference signal ports to use in transmitting reference signals for a random access message, and transmitting, to the base station, a reference signal for the random access message based on a reference signal port of the multiple reference signal ports.

In Aspect 22, the method of Aspect 21 includes receiving, from the base station, a random access response message in response to an initial random access message, and selecting the reference signal port based on a parameter value in the random access response message.

In Aspect 23, the method of any of Aspects 21 includes selecting the reference signal port based at least in part on at least one of a random access preamble, a random access occasion used in transmitting an initial random access message, or a combination thereof.

In Aspect 24, the method of Aspect 23 includes selecting the reference signal port based at least in part on a mapping of the reference signal port to at least one of the random access preamble, the random access occasion, or a combination thereof.

In Aspect 25, the method of Aspect 24 includes receiving the mapping as part of a mapping configuration of mappings between the multiple reference signal ports and multiple random access preambles or random access occasions.

In Aspect 26, the method of Aspect 25 includes receiving the mapping configuration from the base station.

In Aspect 27, the method of any of Aspects 21 to 26 includes determining a first reference signal port of the multiple reference signal ports to use in transmitting a first reference signal for the random access message and a second reference signal port of the multiple reference signal ports to use in transmitting a second reference signal for the random access message, where transmitting the reference signal includes transmitting, to the base station, one of the first reference signal for the random access message based on the first reference signal port or the second reference signal for the random access message based on the second reference signal port.

In Aspect 28, the method of Aspect 27 includes where determining the second reference signal port is based on determining that multiple reference signal ports are configured.

In Aspect 29, the method of any of Aspects 27 or 28 includes where determining the second reference signal port is based on determining to activate multiple reference signal ports based on a command received from the base station.

In Aspect 30, the method of any of Aspects 27 to 29 includes where determining the second reference signal port is based on determining that hopping is configured for the random access message.

In Aspect 31, the method of any of Aspects 21 to 30 includes selecting the reference signal port based at least in part on a SFN or SFI associated with a slot for transmitting the random access message.

In Aspect 32, the method of Aspect 31 includes where selecting the reference signal port is further based at least in part on determining that hopping is configured for the random access message.

In Aspect 33, the method of any of Aspects 21 to 32 includes receiving, from the base station, a random access response message in response to an initial random access message, where the random access response message includes a control channel that indicates a port index of the reference signal port, and selecting the reference signal port based on the port index.

In Aspect 34, the method of any of Aspects 21 to 33 includes selecting the reference signal port based on at least one of a MCS, an estimated delay spread, a SCS indicated for the random access message, or a combination thereof.

Aspect 35 is an apparatus for wireless communication including a transceiver, a memory configured to store instructions, and one or more processors communicatively coupled with the memory and the transceiver, where the one or more processors are configured to perform one or more of the methods of Aspect 1 to 34.

Aspect 36 is an apparatus for wireless communication including means for performing one or more of the methods of Aspect 1 to 34.

Aspect 37 is a computer-readable medium including code executable by one or more processors for wireless communications, the code including code for performing one or more of the methods of Aspect 1 to 34.

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the memory and the transceiver, wherein the one or more processors are configured to:
     receive, from a base station, a configuration indicating multiple reference signal ports to use in transmitting reference signals for a random access message;
     receive, from the base station, a random access response (RAR) message in response to an initial random access message, wherein the RAR message indicates a reference signal port, of the multiple reference signal ports, for transmitting a reference signal for the random access message, and wherein the reference signal port is indicated by one or more reserved bits in the RAR message; and
     transmit, to the base station, the reference signal for the random access message based on the reference signal port of the multiple reference signal ports.

2. The apparatus of claim 1, wherein the one or more processors are further configured to:
   select the reference signal port based on a parameter value in the random access response message.

3. The apparatus of claim 1, wherein the one or more processors are further configured to select the reference signal port based at least in part on at least one of a random access preamble, a random access occasion used in transmitting an initial random access message, or a combination thereof.

4. The apparatus of claim 3, wherein the one or more processors are further configured to select the reference signal port based at least in part on a mapping of the reference signal port to at least one of the random access preamble, the random access occasion, or a combination thereof.

5. The apparatus of claim 4, wherein the one or more processors are further configured to receive the mapping as part of a mapping configuration of mappings between the multiple reference signal ports and multiple random access preambles or random access occasions.

6. The apparatus of claim 5, wherein the one or more processors are further configured to receive the mapping configuration from the base station.

7. The apparatus of claim 1, wherein the one or more processors are further configured to determine a first reference signal port of the multiple reference signal ports to use in transmitting a first reference signal for the random access message and a second reference signal port of the multiple reference signal ports to use in transmitting a second reference signal for the random access message, wherein the one or more processors are configured to transmit the reference signal includes transmitting, to the base station, one of the first reference signal for the random access message based on the first reference signal port or the second reference signal for the random access message based on the second reference signal port.

8. The apparatus of claim 7, wherein the one or more processors are configured to determine the second reference signal port based on determining that multiple reference signal ports are configured.

9. The apparatus of claim 7, wherein the one or more processors are configured to determine the second reference signal port based on determining to activate multiple reference signal ports based on a command received from the base station.

10. The apparatus of claim 7, wherein the one or more processors are configured to determine the second reference signal port based on determining that hopping is configured for the random access message.

11. The apparatus of claim 1, wherein the one or more processors are further configured to select the reference signal port based at least in part on a system frame number (SFN) or slot format indication (SFI) associated with a slot for transmitting the random access message.

12. The apparatus of claim 11, wherein the one or more processors are configured to select the reference signal port further based at least in part on determining that hopping is configured for the random access message.

13. The apparatus of claim 1, wherein the random access response message includes a control channel that indicates a port index of the reference signal port; and wherein the one or more processors are further configured to:
    select the reference signal port based on the port index.

14. The apparatus of claim 1, wherein the one or more processors are further configured to select the reference signal port based on at least one of a modulation and coding scheme (MCS), an estimated delay spread, a subcarrier spacing (SCS) indicated for the random access message, or a combination thereof.

15. An apparatus for wireless communication, comprising:
    a transceiver;
    a memory configured to store instructions; and
    one or more processors communicatively coupled with the memory and the transceiver, wherein the one or more processors are configured to:
      transmit, to a user equipment (UE), a configuration indicating multiple reference signal ports to use in transmitting reference signals for a random access message;
      transmit, to the UE, a random access response (RAR) message in response to an initial random access message; and
      indicate, to the UE, a reference signal port of the multiple reference signal ports to be used in transmitting a reference signal for the random access message; wherein the RAR message indicates the reference signal port, of the multiple reference signal ports, for transmitting the reference signal for the random access message, and wherein the reference signal port is indicated by one or more reserved bits in the RAR message.

16. The method of claim 15, wherein the random access response message includes a parameter value indicating the reference signal port.

17. The method of claim 15, wherein the one or more processors are configured to indicate the reference signal port at least in part by transmitting, to the UE, a mapping of reference signal ports to at least one of random access preambles, random access occasions, or a combination thereof.

18. The method of claim 15, wherein the one or more processors are configured to indicate the reference signal port at least in part by transmitting, to the UE, an indication to activate multiple reference signal ports for transmitting the random access message.

19. The method of claim 15, wherein the random access response message includes a control channel that indicates a port index of the reference signal port.

20. A method for wireless communication, comprising:
receiving, from a base station, a configuration indicating multiple reference signal ports to use in transmitting reference signals for a random access message;
receiving, from the base station, a random access response (RAR) message in response to an initial random access message, wherein the RAR message indicates a reference signal port, of the multiple reference signal ports, for transmitting a reference signal for the random access message, and wherein the reference signal port is indicated by one or more reserved bits in the RAR message; and
transmitting, to the base station, the reference signal for the random access message based on the reference signal port of the multiple reference signal ports.

21. The method of claim 20, further comprising:
selecting the reference signal port based on a parameter value in the random access response message.

22. The method of claim 20, further comprising selecting the reference signal port based at least in part on at least one of a random access preamble, a random access occasion used in transmitting an initial random access message, or a combination thereof.

23. The method of claim 22, further comprising selecting the reference signal port based at least in part on a mapping of the reference signal port to at least one of the random access preamble, the random access occasion, or a combination thereof.

24. The method of claim 23, further comprising receiving the mapping as part of a mapping configuration of mappings between the multiple reference signal ports and multiple random access preambles or random access occasions.

25. The method of claim 24, further comprising receiving the mapping configuration from the base station.

26. The method of claim 20, further comprising determining a first reference signal port of the multiple reference signal ports to use in transmitting a first reference signal for the random access message and a second reference signal port of the multiple reference signal ports to use in transmitting a second reference signal for the random access message, wherein transmitting the reference signal includes transmitting, to the base station, one of the first reference signal for the random access message based on the first reference signal port or the second reference signal for the random access message based on the second reference signal port.

27. The method of claim 26, wherein determining the second reference signal port is based on at least one of:
determining that multiple reference signal ports are configured;
determining to activate multiple reference signal ports based on a command received from the base station; or
determining that hopping is configured for the random access message.

28. The method of claim 20, further comprising selecting the reference signal port based at least in part on a system frame number (SFN) or slot format indication (SFI) associated with a slot for transmitting the random access message.

29. A method for wireless communication, comprising:
transmitting, to a user equipment (UE), a configuration indicating multiple reference signal ports to use in transmitting reference signals for a random access message;
transmitting, to the UE, a random access response (RAR) message in response to an initial random access message; and
indicating, to the UE, a reference signal port of the multiple reference signal ports to be used in transmitting a reference signal for the random access message; wherein the RAR message indicates the reference signal port, of the multiple reference signal ports, for transmitting the reference signal for the random access message, and wherein the reference signal port is indicated by one or more reserved bits in the RAR message.

30. The method of claim 29, wherein indicating the reference signal port includes at least one of:
transmitting, to the UE, a mapping of reference signal ports to at least one of random access preambles, random access occasions, or a combination thereof;
transmitting, to the UE, an indication to activate multiple reference signal ports for transmitting the random access message; or
transmitting, to the UE, a random access response message in response to an initial random access message, wherein the random access response message includes a control channel that indicates a port index of the reference signal port.

* * * * *